May 21, 1935.   W. R. OYSTON   2,002,249
APPARATUS FOR CONTROLLING EXCESSIVE MOVEMENTS IN
SPRUNG BODIES ON MOTOR DRIVEN ROAD VEHICLES
Filed Dec. 21, 1933   4 Sheets-Sheet 1

May 21, 1935. W. R. OYSTON 2,002,249
APPARATUS FOR CONTROLLING EXCESSIVE MOVEMENTS IN
SPRUNG BODIES ON MOTOR DRIVEN ROAD VEHICLES
Filed Dec. 21, 1933 4 Sheets-Sheet 3

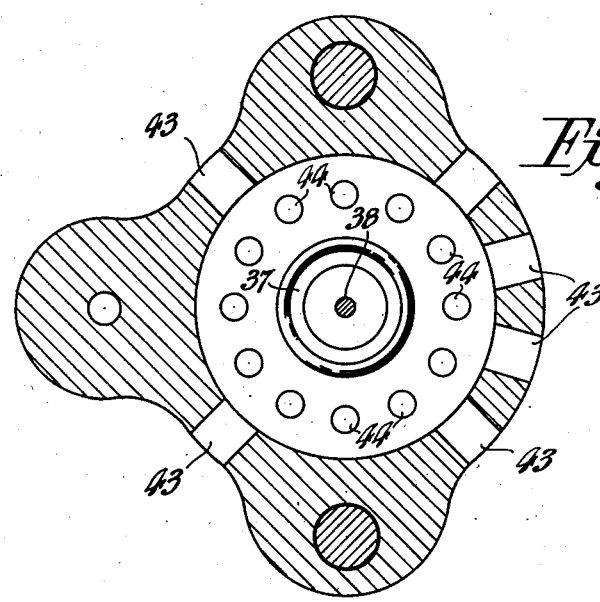
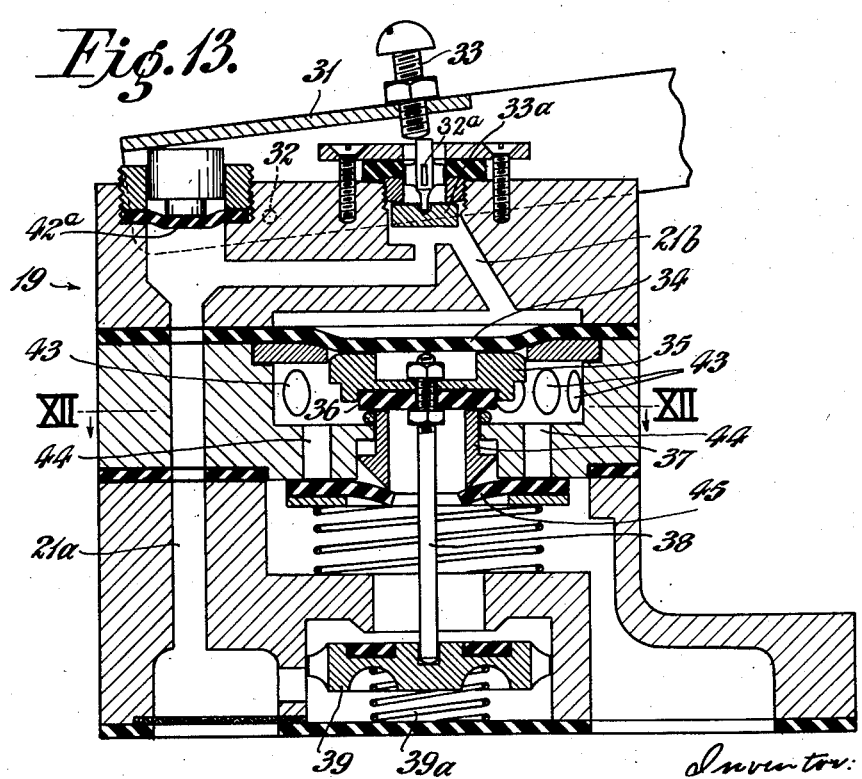

Patented May 21, 1935

2,002,249

UNITED STATES PATENT OFFICE 2,002,249

APPARATUS FOR CONTROLLING EXCESSIVE MOVEMENTS IN SPRUNG BODIES ON MOTOR DRIVEN ROAD VEHICLES

William Robert Oyston, Melbourne, Victoria, Australia

Application December 21, 1933, Serial No. 703,482
In Australia January 24, 1933

10 Claims. (Cl. 280—112)

One of the problems still met with in motor car practice is an efficient control of the body movements relative to the axles and underslung sprung weight of the vehicle.

A study of the subject indicates that the present methods are merely a compromise and unsatisfactory when spring rebound check mechanism is employed, for the reason that the springs are employed to insure easy non-jarring vertical parallel motion which is discounted by the presence of rebound check mechanism and the more rebound is controlled the less effect obtained from the springs and the rougher the riding qualities of the body, that is to say the easier the spring action the greater the rebound movement.

It will be appreciated that if correctly designed springs are employed and only the minimum required resistance offered to rebound allowed under present conditions, the factor of greater importance i. e. pitching, remains uncontrolled.

Observation of the motions of a body indicate that a movement of the undergear tending to depress the forward end of a body operates to lift the rear end and vice versa.

This effect apparently arises from the inertia of the mass of the body, chassis and engine causing what may be termed a theoretical transverse pivot between the ends of the chassis, which partly explains the peculiar pitching action which is set up as distinct from plain parallel upward and downward movement.

The present invention has been devised to smooth out pitching or oscillatory movements of the body relative to the ground surface and essentially consists in utilizing the power of such movements to generate energy and control stored energy, which latter is applied to dampen said movements, that is to say if a force is set up which causes the body to be depressed towards the front axle of the vehicle, the energy mentioned is applied to restrain the resultant uplift of the rear end of the body and vice versa.

It will be evident that if a force, equal in magnitude to that generated by body motion in one direction at one side of the transverse axis, could be applied to the body in the same direction and at the opposite side of said axis, pitching movement of the body would be suddenly arrested and vertical motion set up with the springs supporting the body. Such a condition would however render the body practically rigid particularly if the supporting springs, at the moment the force mentioned was applied to the body, were in a condition when the limit of flexion has been reached.

The present invention however removes this disability in that the opposing energy in excess of that required for a smooth stabilizing action is released or transferred to the source of stored energy.

A diagrammatic arrangement for generating and conducting energy for the purpose stated is shown in Fig. 1 of the accompanying drawings and is included to explain the functions of a practical arrangement for carrying out the invention.

In this arrangement a pair of double acting pistons P, P' are employed, the cylinders C, C' respectively of which are connected in opposed fluid circuits D, D'.

Each of these circuits is in separate valvularly controlled communication via valves V and V' with a pressure storage chamber S and a reservoir R through ports $V^2$ and $V^3$ respectively in said valves.

In the normal position shown in Fig. 1 with the body of the vehicle in a stationary position relative to the wheel axles, the ports $V^3$ are open to the reservoir R and the ports $V^2$ closed.

The piston P is drive coupled to one end of the vehicle body, for example the front end, while the other piston P' is similarly coupled to the opposite end of said body as for example by crank members CM operating in bearings B fixed to the body.

The crank members CM are illustrated in Figs. 2 to 5 inclusive of the accompanying drawings, one end being connected to the axles A and A', and the other end utilized to engage a slot in one of the pistons and impart reciprocation thereto.

In Fig. 2 the body is assumed to be parallel to the wheel axles with the crank member ends in parallel relationship and the pistons centrally disposed in the cylinders.

On a force being applied to the body to set up depression of its forward end and resultant uplift at the rear end as in Fig. 3 the crank member ends recede from each other and impart movement to the pistons in opposite directions.

The piston P associated with the forward crank member CM moves upwardly while the piston P' controlled by the rear end of the body moves in opposition, which movements are resisted by the fluid circuit D'. The pressure from storage chamber S is also added to the fluid circuit D' consequent upon valve V being moved to bring port $V^2$ into position to allow the upper end of cylinder C and lower end of cylinder C' to communicate with said storage chamber S.

This positioning of the valve port $V^2$ is effected by movement of its valve body V relative to the balanced inertia device at I which is coupled to the rotor member of the valve V through a hydraulic coupling at HC' arranged so that it operates said rotor member only when the latter moves in a direction away from said inertia device at I, which arrangement is repeated for valve V' and consequently the latter still remains in a position with the port $V^2$ closed and the port $V^3$ open to the reservoir R.

Conversely when a force is applied to the body to depress the rear end of the body as in Fig. 4 the fluid circuit D and valve V' co-operate to establish fluid resistance against the pistons.

It will be appreciated that when the body is subjected solely to vertical movements relative to the axles A and A', no relative movement will occur between the valves V and V' and the inertia device at I, and consequently these valves will remain in the position shown in Fig. 1 and the pistons P and P' will be moved only in the same direction as the crank members CM which will also be moved in the same direction as indicated by Fig. 5 where the distance between said crank members and the axles is shown decreased (as compared with Fig. 2) by a downward movement of the body parallel to the axles.

The movement of both pistons P, P' in the same direction will merely operate to displace fluid from ahead of one piston to the rear of the other via fluid circuits D and D'.

It will be evident that when the disturbing force applied to the body has been dissipated the crank members CM will have restored the pistons to the normal position and the valves V, V' to the same position in Fig. 1 and no voids can occur in the fluid circuits D and D' and in the cylinders C and C' because of the communication of the former with the reservoir R through port $V^3$ in the valves V and V'.

It is to be noted that the reactionary force, against the fluid resistance to opposed movements of the pistons P and P', will be transmitted by the fluid lines to the storage chamber S and further that a pressure available in the latter at any time should not approach such a magnitude that it will operate to lock the pistons against movement in opposite directions when applied thereto and so set up a harsh check to body movements.

The remaining figures of the accompanying drawings depict practical examples of apparatus embodying the invention and adapted to perform the several functions above described with reference to Figs. 1 to 5 inclusive.

In these remaining figures of drawings—

Fig. 6 is a plan of an assembly to be attached to the body or chassis and containing pistons and valves and having the crank members mounted in bearings therein, and with the top cover and inertia device removed.

Fig. 7 being an elevation, partly in section of same and with said cover and inertia device included.

Fig. 12 is a section on line XII—XII in Fig. 13.

Fig. 13 is an enlarged section through the valve unit.

Figure 1:
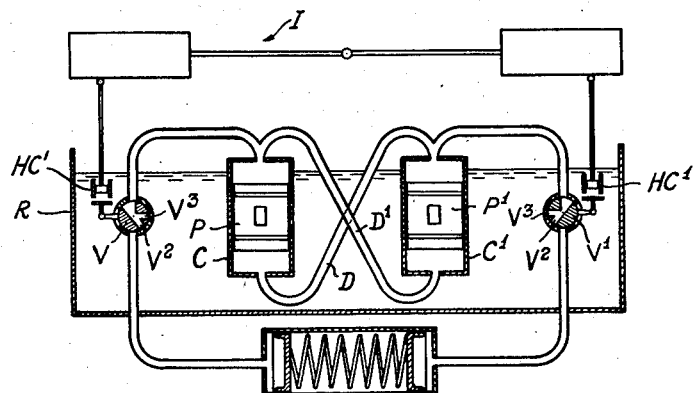
Figure 2:
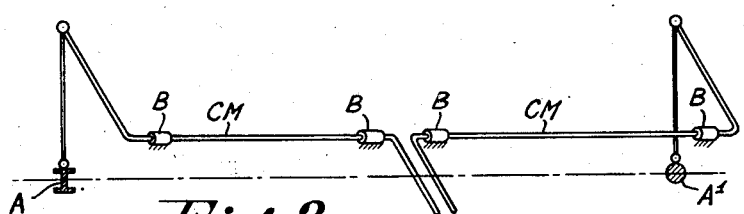
Figure 3:
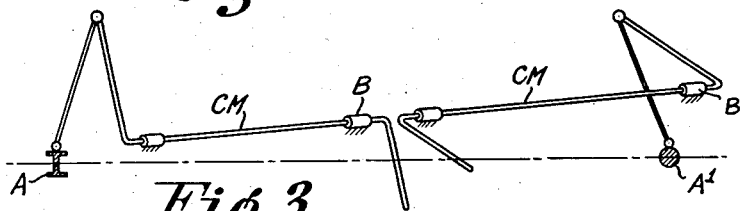
Figure 4:
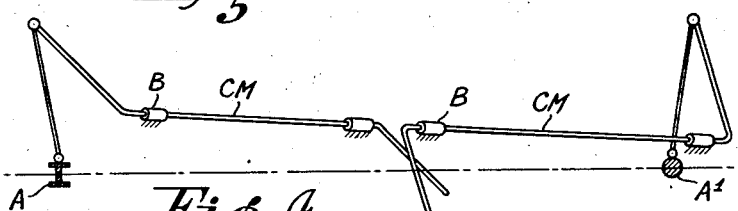
Figure 5:
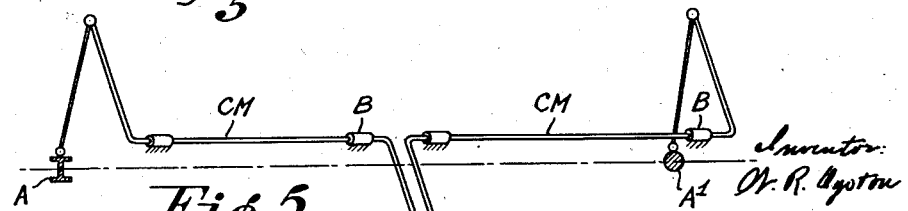
Figure 6:
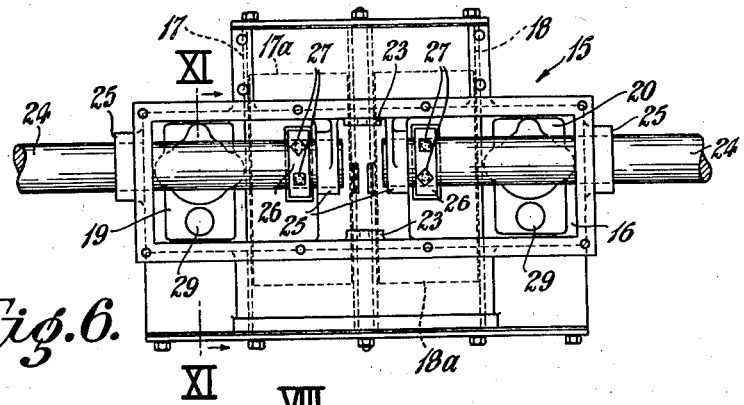
Figure 7:
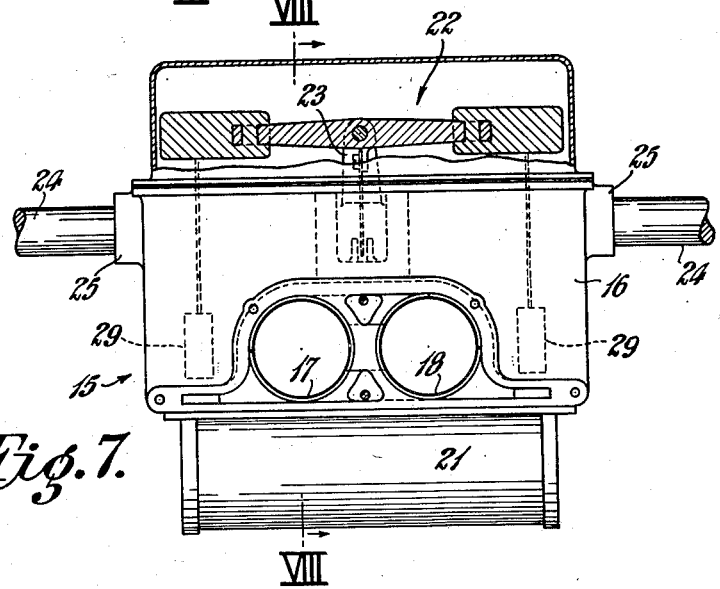
Figure 8:
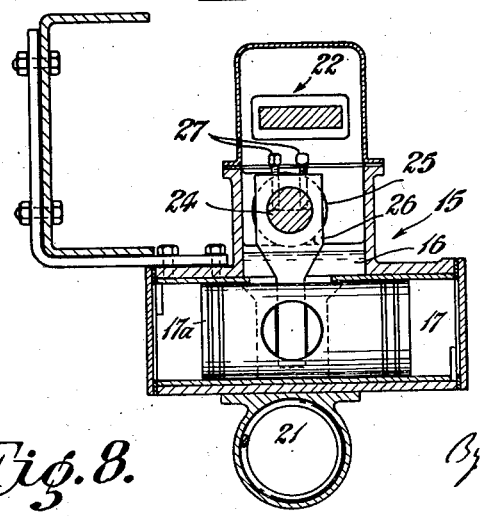
Fig. 8 is a transverse section on line VIII—VIII in Fig. 7.

In the following description the reference letters in brackets, following reference numbers identifying parts in Figs. 6 to 13 are added to indicate the functional equivalents of those parts in Figs. 1 to 5. These bracketed reference letters will be used only when a corresponding functional equivalent is first referred to.

Referring now to Figs. 6 to 13, the casing 15 constitutes a reservoir 16 (R), cylinder block with cylinders 17 and 18 (C and C') having double acting pistons 17a and 18a (P and P') operating therein, a valve unit 19 (V) and 20 (V') being mounted at opposite ends of the reservoir. A storage chamber 21 (S) is carried on the bottom of said casing. The inertia device 22 (I) is pivotally mounted in brackets 23 upon the casing 15.

The crank members 24 (CM) pass through bearings 25 (B) provided in said casing and have their inner ends terminating with a crank arm 26 (secured thereto by set screws 27) engaging a slot in the pistons 17a and 18a. The outer ends of said crank members 24 are arranged as shown in Figs. 2 to 5 for actuation by relative motion between the body and vehicle axles.

The crank arms 26 being moved in opposition consequent upon a body pitching movement as before explained, the pistons 17a and 18a will travel in opposition and movement of the casing 15 in unison with said body movement will cause a relatively upward movement of one of the starter pistons 28, pendulously attached to the pivoted balanced inertia device 22 and contained in cylinders 29, and it is to be noted that 28 and 29 are equivalent to HC' in Fig. 1.

Figure 9:
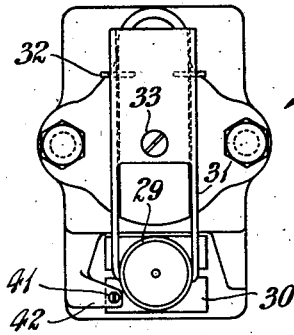
Figs. 9 and 10 are plan and side elevation respectively of a valve unit.
Figure 10:
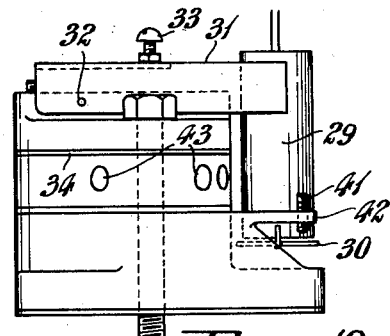
Figure 11:
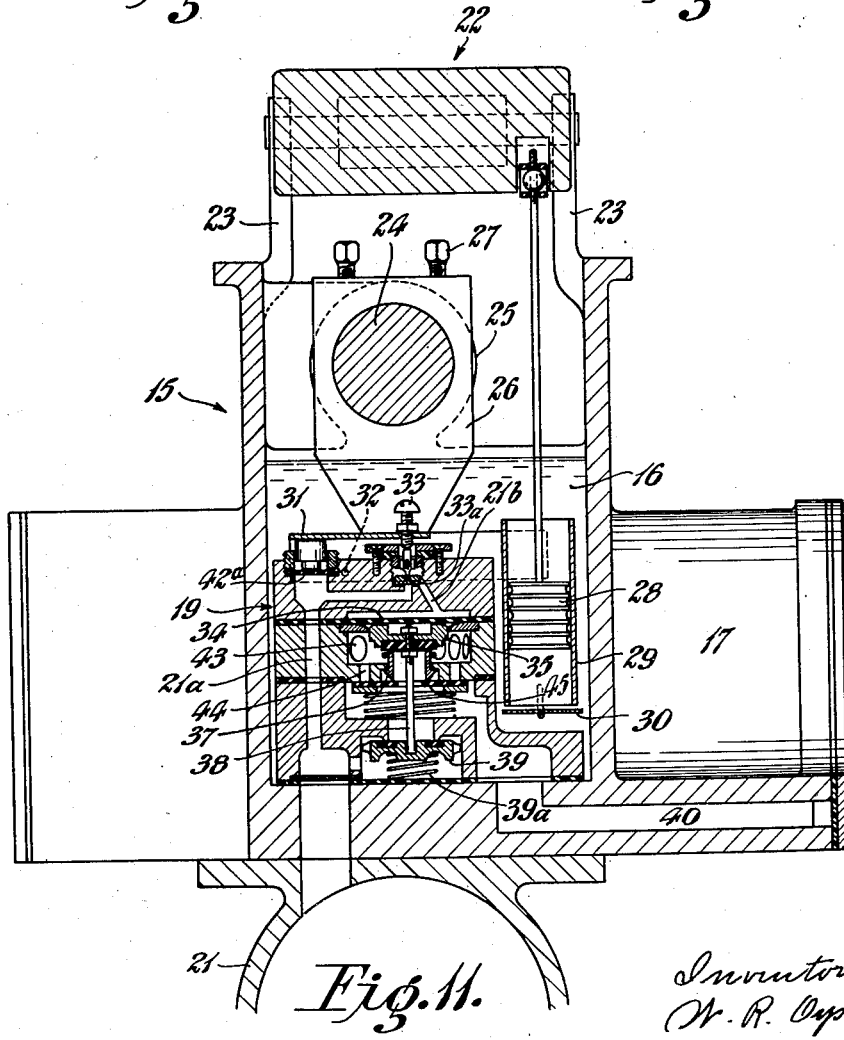
Fig. 11 is an enlarged section on line XI—XI in Fig. 6.

The uplift of a starter piston 28 (see Fig. 11) will establish suction in its cylinder 29 which will operate to close the disc valve 30 onto the bottom open end of the latter to retain said suction and cause the cylinder 29 to also lift and thereby impart raising movement to the arm 31 pivoted at 32 to which it is attached (Figs. 9 and 10).

This movement of arm 31 will release the starter relay valve pin 32a controlled by adjustable pin 33 carried by said arm 31, and the pressure from storage chamber 21 via passages 21a will be free to proceed along passage 21b and depress the flexible diaphragm 34 (see Fig. 13).

Depression of the diaphragm 34 will cause the member 35, a valve disc 36 and tubular valve seating 37 about pin 38 to also descend and the latter will force valve 39 off its seating and allow pressure to pass from storage chamber 21 via passages 40 ($V^2$) into cylinders 17 and 18 to oppose the drive of the pistons 17a and 18a therein under the influence of the crank arms 26. When the suction effect in the cylinder 29 ceases either by restoration of the relative normal position of the same to the inertia device 22 or by the disc valve 30 being opened by contact with the adjustable stop 41 (see Fig. 10) carried by an extension or lug 42 on the casing 15, the arm 31 with pin 33, urged by pressure on the diaphragm at 42a, will also be restored to normal position in Fig. 11 to permit the closure of starter relay valve 33a. Closure of relay valve 33a by depression of pin 32a removes operative pressure from the diaphragm 34, and the valve 39 will also now be closed under the influence of its supporting spring 39a (see Fig. 11).

To ensure against excess fluid and voids in the system, breathing communication with the reservoir 16 via the passages 40 (now as V³) occurs into the reservoir due to the breathing pressure lifting the valve disc 36 carried by member 35 upwardly away from valve seating 37 to provide a passageway through the latter to the radial series of ports 43 open to the reservoir 16. This raising of the valve disc 36 is possible only when the starter relay valve 33a is closed and consequently no downward pressure exists on the flexible diaphragm 34 from the storage chamber 21. It is to be noted that the pin 38 used for opening the valve 39 is free to move upwardly and independently of the latter.

Breathing from the reservoir 16 occurs to passages 40 (still as V³) by suction past spring retained flexible ring valve 45 via ports 43 and 44, the arrangement of the latter being clearly shown in Fig. 12.

To relieve pressure to the reservoir 16 which may be trapped between starter relay valve 33a and the upper side of diaphragm 34, a by-pass is arranged at one side of said valve and through the bore of the pin 33 which by-pass functions only when the latter is closed. The starter relay valve 33a when open to allow pressure from storage chamber 21 to pass through passage 21b will operate to close any passage through the bore of pin 33.

I claim:—

1. In spring supported motor vehicle bodies, a device for controlling oscillatory motion of the body about a transverse axis comprising means actuated by the motion at each end of the body relative to the wheel axle associated therewith, two double acting pistons each in a fluid filled cylinder actuated by said means, a fluid circuit connecting the cylinders for driving both pistons in opposition to said circuit, a pressure storage chamber, valvular means controlling communication of said fluid circuit with said pressure storage chamber, an inertia device, said valvular means being controlled by movement of itself relative to said inertia device, a fluid reservoir, a further fluid circuit connecting said first fluid circuit to said fluid reservoir, and valvular means functioning independently of said first mentioned valvular means and controlling said second circuit, all for the purpose described.

2. In spring supported motor vehicle bodies, apparatus consisting of a pair of cylinders, a double acting piston in each cylinder, two crank members mounted on the vehicle chassis and to which said pistons are coupled, each crank member being connected to one of the vehicle axles, opposed fluid circuits connecting said cylinders, a pressure storage chamber, a fluid reservoir, additional fluid circuits including said pressure storage chamber and said fluid reservoir and to which said first-mentioned circuits are connected, valvular means in each of the latter circuits for independently controlling communication thereof with said chamber and reservoir, and a pivoted balanced inertia device, said valvular means being controlled by relative movement between itself and said balanced inertia means for setting up communication of the cylinders with the storage chamber.

3. In spring supported motor vehicle bodies, apparatus as set forth in claim 2, and in which the valvular mechanism specified therein comprises a starter relay valve actuated by relative movement in one direction between it and said pivoted balanced inertia device to permit flow of stored energy from said storage chamber, and a diaphragm operating a valve in the fluid circuit from said chamber to the piston cylinders and actuated by flow of energy from said storage chamber.

4. In spring-supported motor vehicle bodies, a pair of cylinders, a double-acting piston in each cylinder, two crank members mounted on the vehicle chassis and to which said pistons are coupled, each crank member being connected to one of the vehicle axles, opposed fluid circuits connected to said cylinders, a pressure storage chamber, fluid circuits connected to said storage chamber, each of said first-mentioned fluid circuits being connected to a corresponding one of said second-mentioned fluid circuits, a fluid reservoir, said second-mentioned fluid circuits including said pressure storage chamber and fluid reservoir, a starter relay valve in each of said second-mentioned circuits, a pivoted balanced inertia device, said starter relay valves being actuated by relative movement in one direction between themselves and said inertia device to permit flow of stored energy from said storage chamber, a diaphragm and a valve operated thereby in each of said second fluid circuits and actuated by flow of energy from said storage chamber to the piston cylinders, said last-mentioned valves being spring-supported, and pins freely entering the valves and actuated by the diaphragm for effecting the opening thereof.

5. In spring-supported vehicle bodies according to claim 4, a pivoted arm controlling said starter relay valve, a cylinder carried by said pivoted arm, a piston in said cylinder and coupled to said balanced inertia device, a pin carried by said pivoted arm, relative movement in one direction between said piston and said cylinder actuating said pivoted arm to displace said last-mentioned pin, said last-mentioned pin maintaining said starter relay valve in closed position against the pressure from the pressure storage chamber.

6. In spring supported vehicle bodies according to claim 4, a pivoted arm controlling said starter relay valve, a cylinder carried by said pivoted arm, a piston in said cylinder and coupled to said balanced inertia device, a pin carried by said pivoted arm, relative movement in one direction between said piston and said cylinder actuating said pivoted arm to displace said last-mentioned pin, said last-mentioned pin maintaining said starter relay valve in closed position against the pressure from the pressure storage chamber, and a diaphragm subjected to pressure from the storage chamber and coacting with said pivoted arm to maintain the starter relay valve in its closed position.

7. In spring-supported motor vehicle bodies, a pair of cylinders, a double-acting piston in each cylinder, two crank members mounted on the vehicle chassis and to which said pistons are coupled, each crank member being connected to one of the vehicle axles, opposed fluid circuits connecting said cylinders, a pressure storage chamber, a fluid reservoir, additional fluid circuits including said pressure storage chamber and said fluid reservoir and to which said first-mentioned circuits are connected, a pivoted balanced inertia device, a starter relay valve for each of the last-mentioned circuits for independently controlling the communication of its corresponding circuit with said chamber and reservoir, said starter relay valve being actuated by relative movement in one direction between itself and said inertia device to permit flow of stored energy from said storage chamber, a diaphragm and a valve operated thereby in the fluid circuit from the storage chamber to the piston cylinders and actuated by flow of energy from said storage chamber, a disc member actuated by said diaphragm, a depending pin on said disc member, serving to move the valve which controls communication from the pressure storage chamber into its open position, a flexible disc valve carried by said disc member, and a tube disposed about said pin and serving at one end as a seat for said disc valve, said tube and disc valve being separable under pressure, when the said diaphragm is shut off from communication with the pressure storage chamber, to set up breathing communication from the piston cylinders to said fluid reservoir.

8. Apparatus according to claim 7 in which the said flexible disc valve is spring-supported.

9. In spring-supported vehicle bodies according to claim 4, a pivoted arm controlling said starter relay valve, a cylinder carried by said pivoted arm, a piston in said cylinder and coupled to said balanced inertia device, a pin carried by said pivoted arm, relative movement in one direction between said piston and said cylinder actuating said pivoted arm to displace said last-mentioned pin, said last-mentioned pin maintaining said starter relay valve in closed position against the pressure from the pressure storage chamber, the said pin having a bore therein communicating with said fluid reservoir, a bypass communicating with the space above the diaphragm, and with which said bore coacts, whereby pressure trapped in said space above the diaphragm can be released to the reservoir when the diaphragm is shut off from communication with the pressure storage chamber.

10. In spring supported motor vehicle bodies, a device for controlling oscillatory motion of the body about a transverse axis, comprising means actuated by said motion for generating energy, means for storing said energy, and means serving to control the application of said stored energy to dampen said motion, any excess or reactionary energy so applied being released or transferred to the source of stored energy.

WILLIAM ROBERT OYSTON.